June 23, 1959  J. SCHWAHN  2,891,457
SHUTTERS FOR PHOTOGRAPHIC CAMERAS
Filed Feb. 23, 1955
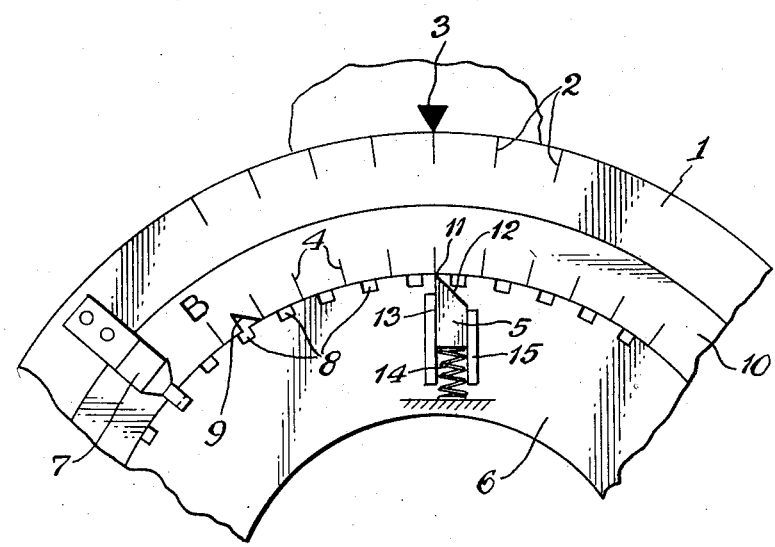
INVENTOR:
Josef Schwahn,
BY Singer, Stern & Carlberg
ATTORNEYS.

2,891,457
SHUTTERS FOR PHOTOGRAPHIC CAMERAS

Josef Schwahn, Stuttgart, Germany, assignor to Zeiss Ikon A.G., Stuttgart, Stuttgart, Germany Application February 23, 1955, Serial No. 490,072

Claims priority, application Germany March 8, 1954

3 Claims. (Cl. 95—64)

The invention relates to shutters for photographic cameras and particularly is directed to central shutters which are arranged between the lenses of a camera lens system. Shutters of this type are usually constructed to perform, in addition to a number of automatic short exposures also a time exposure, namely a so-called "B" exposure. When the shutter is adjusted to the "B" position, the shutter remains open and the film is exposed to light passing through the lens system as long as the shutter release member remains pressed downwardly. It is customary to arrange this "B" position of the shutter adjacent one end of the shutter speed graduation.

It has been proposed heretofore to provide central shutters of this type with concentrically arranged shutter speed adjusting and diaphragm adjusting rings and to provide a coupling for connecting these two rings with each other in various positions relatively to each other so that two adjustments are made at the same time when one ring is rotated—namely, a change of the speed of the shutter and a change in the size of the diaphragm. The adjustments take place in such a manner that when the exposure time is made shorter, then at the same time the diaphragm aperture is increased, while—vice versa— when the exposure time is made longer, the size of the lens diaphragm is made smaller. When these two adjusting members are coupled with each other, there are available a number of adjustment ranges comprising successively adjusted shutter speeds and diaphragm apertures, and when these values are used, the exposure of the film will not be changed thereby.

Furthermore, it also has been proposed to construct exposure meters in such a manner that the measurements are readable on a light value graduation, which likewise is arranged on the shutter in the form of an adjustment graduation.

The drawing illustrates diagrammatically a front elevation view of a central shutter constructed in accordance with the present invention.

The drawing illustrates a central shutter having an outer rotatable ring 1 which constitutes the diaphragm adjusting member and is provided with a diaphragm graduation 2. This diaphragm adjusting member 1 is rotatable relatively to a stationary mark 3. The ring 1 is rotatably mounted on a stationary part 10 of the shutter, which part is provided with a shutter speed graduation 4. This graduation 4 is arranged opposite a mark 5 provided on an inner rotatable ring 6 arranged concentrically within the outer ring 1. The inner rotatable ring 6 constitutes the shutter speed adjusting member. The shutter speed graduation 4 is provided on one end with a mark "B" arranged next to the largest shutter speed value which may be, for instance, one second. Of course, this mark "B" on the shutter speed graduation 4 could also be arranged on another point of this graduation but it is customary to arrange it next to the largest exposure value indicated by the shutter speed graduation 4.

The previously mentioned coupling between the rotatable diaphragm adjustment ring 1 and the shutter speed adjusting ring 6 consists in the present instance of a yieldable member 7 which is secured to the diaphragm adjustment ring 1 and extends over the stationary shutter speed graduation 4 in order to extend selectively into one of a series of notches 8 provided on the outer circumference of the rotatable shutter speed adjustment ring 6. The coupling 7 by means of a suitable shape of the notches 8 and of the cooperating coupling member may be made rigid, or if desired, also releasable.

Cameras of this type are known as Compur shutter cameras of the type shown in United States Patents 1,584,408, Topliff et al., May 11, 1926, for Photographic Shutter, 2,222,298, Nerwin, Nov. 19, 1940, for Adjustable Diaphragm, 2,652,756, Willcox, Sept. 22, 1953, for Photoghaphic Diaphragms.

The invention relates to central shutters which are provided with the mentioned coupling between the shutter speed and diaphragm adjustment rings and also has the mentioned "B" position, and the improvement consists in this that a provision is made that the "B" adjustment cannot be made as long as the mentioned coupling between the diaphragm adjustment ring and shutter speed adjustment ring is operative. If, for instance, the diaphragm of the shutter could be adjusted to the "B" position, the latter would very likely be associated with a very small diaphragm opening, but upon pressing the shutter release member, the shutter would effect an exposure of an indefinite time since the length of time depends upon how long the release member of the shutter remains depressed. Therefore, wrong exposures are possible. For eliminating this disadvantage, the present invention provides for central shutters of the described type a locking device which prevents any "B" exposure—at least for as long as the diaphragm adjustment member remains coupled to the shutter speed adjustment member.

According to a preferred modification of the invention, the locking device is constructed in such a manner that it will prevent an adjustment of the shutter speed adjustment member to the "B" position. In such a case, the "B" position can no longer be used with any possible shutter speed and diaphragm combination, which are automatically adjusted to each other when one selects a certain value, whereupon the other value is automatically adjusted so that the exposure of the film remains always the same.

According to another embodiment of the invention, the locking device is constructed in such a manner that the release of the shutter is made impossible when the shutter speed adjustment member moves into the "B" position.

The locking device may be arranged on a stationary part of the shutter and then may be moved into the path of movement of a member provided on the shutter speed adjustmnet member, if necessary, dependent upon the establishment of an operative connection between the shutter speed adjustment member and the diaphragm adjustment member. On the other hand, the locking device may also be arranged yieldably on the shutter speed adjustment member in order to cooperate with a stationary member shortly before reaching the position in which a "B" exposure is possible. When the locking device is made releasable, then it may be possible to perform a "B" exposure.

The drawing illustrates a very simple and favorable arrangement of such a locking device. The locking device consists of a spring actuated radially slidable member which is mounted on the shutter speed adjustment member 6. At the same time, this slidable member constitutes the mark 5 which indicates the shutter speed, because it is arranged opposite the stationary shutter speed graduation 4 on the shutter part 10. The slidable member 5 is provided on its outer end, which faces the graduation 4, with a point 11 and an inclined surface 12, whereby the point 11 engages yieldably the inner edge of the fixed part 10 of the shutter which carries the shutter speed graduation 4. When the shutter speed adjustment ring 6 is rotated with its mark 5 toward the increased exposure values—namely, in counterclockwise direction, then the slidable member 5 will engage a notch 9 arranged a short distance in advance of the "B" position. In this position, the shutter has not as yet made the "B" exposure position effective. The notch 9 in the stationary part of the said shutter has the same shape at the point 11 on the slidable member 5. It is, therefore, impossible to rotate the shutter speed adjusting members toward the "B" graduation in view of the radial face 13 of the member 5. On the other hand, the shutter speed adjusting member 6 may be rotated clockwise, because the inclined surface 12 on the slidable member 5 will automatically slide outwardly of the notch 9 against the action of the spring 14 which normally urges the slidable member 5 radially outwardly in a suitable guide 15. By means of a handle element and perhaps a locking device which are not shown, it is possible to lock the slidable member 5 in its disengaged or withdrawn position if that should be desirable. It is then possible to adjust the shutter to a "B" exposure which action, however, is made impossible when the shutter speed adjustment member 6 with a released slidable member 5 approaches the "B" position on the graduation 4, regardless of whether the shutter speed adjustment member 6 or the diaphragm adjustment member 1, coupled to the latter, is rotated, and regardless of what relative position the two members 1 and 6 have relatively to each other.

What I claim is:

1. In a central shutter for photographic cameras, a stationary shutter part provided with an annular portion provided with a shutter speed scale thereon which extends along the circumference of said annular portion, one end of said shutter speed scale having a scale line indicated with "B," having the meaning "time exposure," a diaphragm adjusting ring arranged rotatably and concentrically around said annular portion of said stationary shutter part, a diaphragm value indicating scale on said diaphragm adjusting ring, a shutter speed adjusting ring arranged rotatably and concentrically within said annular portion of said stationary shutter part, means on said shutter speed adjusting ring forming a single index mark which moves relatively to said shutter speed scale on said stationary annular portion of said shutter part when said shutted speed adjusting ring is rotatably adjusted, a coupling means releasably connecting said diaphragm adjusting ring and said shutter speed adjusting ring with one another for permitting a simultaneous rotative adjustment of both said rings with respect to a stationary mark arranged opposite said diaphragm value indicating scale, said coupling means being adapted to lock said two rotatable adjusting rings selectively together in different relative positions, said annular portion of said stationary shutter part being provided with a notch at a position between said "B" scale line and the next shutter speed scale line of said shutter speed scale, said index forming means on said rotatable shutter speed adjusting ring including a yieldably mounted pointed member engaging with its point the inner circumference of said annular portion of said stationary shutter part, said point being provided for entering said notch in said annular portion when said shutter speed adjusting ring is rotated in a direction toward said "B" scale line, thereby preventing an adjustment of said shutter speed adjusting ring to the speed value "B" as long as said coupling means is operative to couple said two rotatable adjusting rings with one another.

2. In a central shutter for photographic cameras, a stationary shutter part provided with an annular portion provided with a shutter speed scale thereon which extends along the circumference of said annular portion, one end of said shutter speed scale having a scale line indicated with "B," having the meaning "time exposure," a diaphragm adjusting ring arranged rotatably and concentrically around said annular portion of said stationary shutter part, a diaphragm value indicating scale on said diaphragm adjusting ring, a shutter speed adjusting ring arranged rotatably and concentrically within said annular portion of said stationary shutter part, means on said shutter speed adjusting ring forming a single index mark which moves relatively to said shutter speed scale on said stationary annular portion of said shutter part when said shutter speed adjusting ring is rotatably adjusted, a coupling means releasably connecting said diaphragm adjusting ring and said shutter speed adjusting ring with one another for permitting a simultaneous rotative adjustment of both said rings with respect to a stationary mark arranged opposite said diaphragm value indicating scale, said coupling means being adapted to lock said two rotatable adjusting rings selectively together in different relative positions, said annular portion of said stationary shutter part being provided with a notch at a position between said "B" scale line and the next shutter speed scale line of said shutter speed scale, said index forming means on said rotatable shutter speed adjusting ring including a yieldably mounted pointed member engaging with its point the inner circumference of said annular portion of said stationary shutter part, said point being provided for entering said notch in said annular portion when said shutter speed adjusting ring is rotated in a direction toward said "B" scale line, thereby preventing an adjustment of said shutter speed adjusting ring to the speed value "B" as long as said coupling means is operative to couple said two rotatable adjusting rings with one another, said notch having a triangular shape with a radial wall adjacent said "B" scale line and an inclined wall directed toward the next shutter speed scale, and the yieldably mounted member on said rotatable shutter speed adjusting ring having a correspondingly shaped triangular point, so as to cause a disengagement of said point from said notch only when said shutter speed adjusting ring is rotated in a direction away from the "B" scale line of said shutter speed scale.

3. A central shutter as claimed in claim 1, in which said coupling means is formed by a yieldable member secured on one of said rotatable adjusting rings and extending over said annular portion of said stationary shutter part, and a plurality of notches arranged in the circumference of said other one of said rotatable adjusting rings, any one of said notches being adapted to be engaged by said yieldable member so that both said adjusting rings may be rotatably adjusted in unison relatively to said stationary shutter part.

References Cited in the file of this patent

UNITED STATES PATENTS

| 2,150,365 | Dziewoir | Mar. 14, 1939 |
| 2,358,061 | Drotning | Sept. 12, 1944 |
| 2,580,324 | Schwarz | Dec. 25, 1951 |
| 2,630,049 | Stein | Mar. 3, 1953 |

FOREIGN PATENTS

| 303,088 | Germany | Aug. 25, 1916 |